March 22, 1966  G. R. TURBETT  3,241,229
APPARATUS AND METHOD FOR VERTICAL WELDING
Filed Dec. 31, 1963  7 Sheets-Sheet 1

FIG. 1

INVENTOR
GEORGE R. TURBETT

March 22, 1966 G. R. TURBETT 3,241,229
APPARATUS AND METHOD FOR VERTICAL WELDING
Filed Dec. 31, 1963 7 Sheets-Sheet 2

FIG. 2

INVENTOR
GEORGE R. TURBETT

March 22, 1966    G. R. TURBETT    3,241,229
APPARATUS AND METHOD FOR VERTICAL WELDING
Filed Dec. 31, 1963    7 Sheets-Sheet 3

INVENTOR
GEORGE R. TURBETT

March 22, 1966  G. R. TURBETT  3,241,229
APPARATUS AND METHOD FOR VERTICAL WELDING
Filed Dec. 31, 1963  7 Sheets-Sheet 4

INVENTOR
GEORGE R. TURBETT

March 22, 1966      G. R. TURBETT      3,241,229
APPARATUS AND METHOD FOR VERTICAL WELDING
Filed Dec. 31, 1963      7 Sheets-Sheet 5

INVENTOR
GEORGE R. TURBETT

March 22, 1966 G. R. TURBETT 3,241,229
APPARATUS AND METHOD FOR VERTICAL WELDING
Filed Dec. 31, 1963 7 Sheets-Sheet 7

INVENTOR
GEORGE R. TURBETT

United States Patent Office 3,241,229
Patented Mar. 22, 1966

3,241,229
APPARATUS AND METHOD FOR VERTICAL
WELDING
George R. Turbett, Chatham Township, N.J., assignor to
Air Reduction Company, Incorporated, New York,
N.Y., a corporation of New York
Filed Dec. 31, 1963, Ser. No. 334,769
10 Claims. (Cl. 29—493)

My invention relates to vertical welding and more particularly to arrangements for finishing off a vertical weld at the top of a seam between a pair of workpiece plates, and for moving a welding head from one vertical seam location to another, as well as vertically during the actual process of welding.

In vertical welding, it is customary to employ a pair of welding dams, one on either side of the workpiece plates, to confine the molten material of the weld pool until it solidifies and sometimes also to avoid dissipation of shielding gas during welding. The welding dams are preferably pressed against the workpiece plates by yieldable, pivoted mechanical means so that the dams can conform to slight irregularities in the plate surfaces in order to avoid the escape of molten material which might occur if the dams were moved along a fixed track without permitting any yielding or rotation of the dams. When the dams begin to extend beyond the top edges of the workpiece plates, the dams are free to rotate upon their pivots and around the top edges of the workpiece plates.

One solution of the problem of maintaining the dams in proper operative position at the upper end of the seam is to weld or otherwise attach extension tabs to the workpiece plates, but this involves extra time and inconvenience both in attaching the tabs and in removing them after the seam is completed.

In accordance with one feature of the invention, I employ readily attachable and removable tabs, which I sometimes term "run-off guide plates" or simply "run-off guides" or "run-off plates" which provides a place for the welding dams to run off the edge of the seam while continuing in proper functional relationship to the work. In accordance with another feature of the invention, I use a carriage which is movable along the upper edges of the workpiece plates and is supported by these plates. The carriage in turn provides support from which the welding machine or head is suspended. As an integral part of the carriage I provide a slotted support member in the form of a vertical plate to which the run-off guide plates are removably attached.

The slot in the vertical plate extends vertically and is preferably of the same width as the gap between the workpieces but with a widened lower slot portion to accommodate a welding dam. The run-off plates are preferably of the same thickness as the workpiece plates. The run-off plates are vertically aligned with the workpiece plates and are separated from each other by a vertical gap which is also preferably of the same width as the gap between the workpiece plates. The apparatus disclosed herein may be hoisted into position upon the top of a tier of plates in a partially completed tank of cylindrical form as by means of a crane and then rolled as by motor driven means along the top edge of the plates to a position where the gap between the run-off guide plates is vertically aligned with the gap between a pair of adjacent workpiece plates that are to be welded. When the slot in the support member is vertically and laterally aligned with the gap between the run-off plates and is at the same time vertically aligned with the gap between the workpiece plates, a welding head with narrow projecting parts may be lowered, passing freely through the aligned slots or gaps to reach a starting position at the bottom of a seam to be welded. Welding may then be started and may proceed in normal manner from bottom to top of the seam, the welding dams running smoothly upward onto the run-off guides to enable the seam to be completed to the top while fully supporting the dams when the latter run off the tops of the plates being welded. Upon completion of the weld, the arc may be extinguished and the welding head may be further raised to a nesting position in which all parts of the welding head which normally project through the slot between the workpiece plates are accommodated either in the slot between the run-off guides or in the vertical slot in the slotted guide plate, thus freeing the carriage and welding head to be moved along the top edges of the workpiece plates. The carriage and welding head may then be moved as a unit along the workpiece plates to the location of another vertical seam, at which location the slots or gaps may again be aligned and the welding head may be lowered to the bottom position to start the next vertical weld.

A general object of the invention is to reduce the time consumed in vertical welding operations.

Another general object is to facilitate a vertical welding operation.

A particular object is to properly support a pivotally mounted welding dam as it runs off the edge of the workpiece plates at the top of a vertical seam.

A further particular object is to support a welding machine upon generally vertical workpiece plates which are to be welded.

Another object is to facilitate the transfer of a welding machine from the location of one vertical seam to the location of another vertical seam.

Other objects, features and advantages will appear from the following more detailed description of illustrative embodiments of the invention, which will now be given in conjunction with the accompanying drawings.

Figure 1:
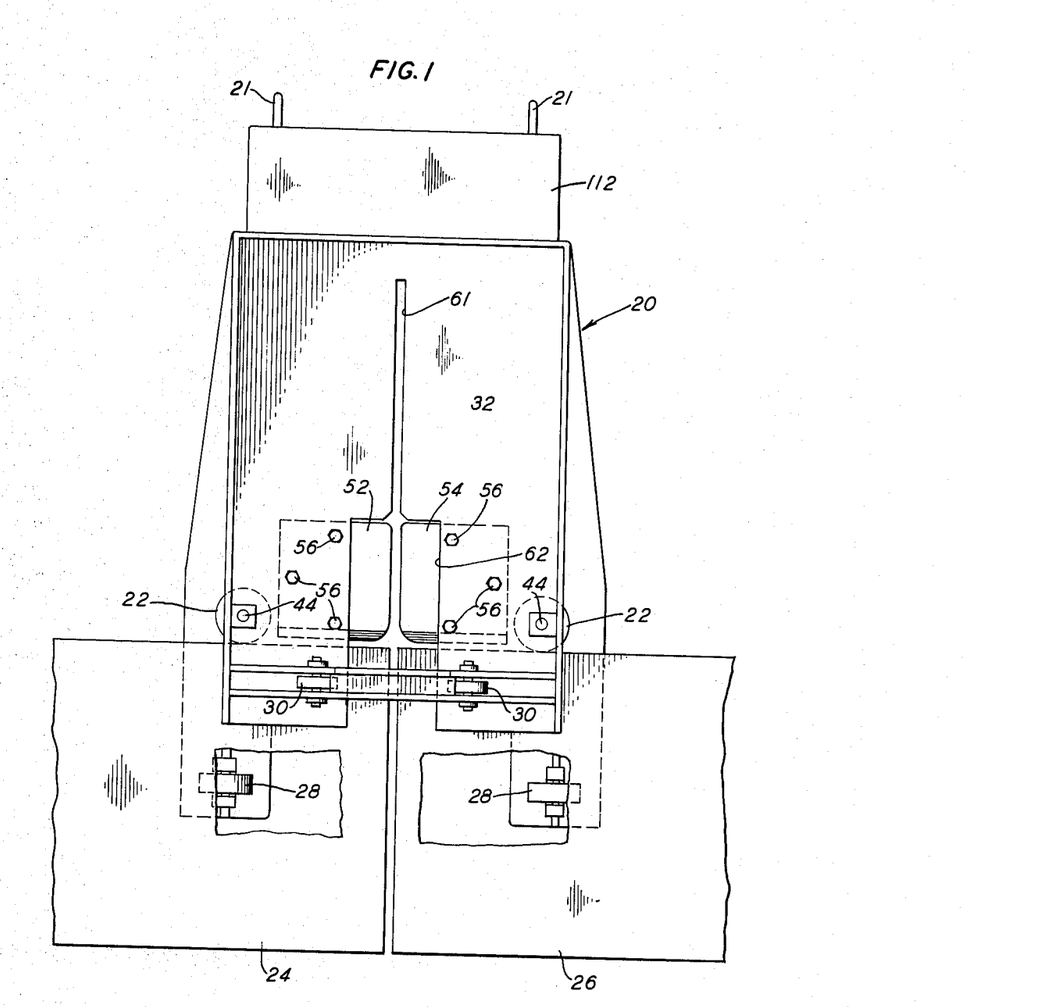
FIG. 1 is a front elevation, partly broken away, of a vertical welding machine carriage embodying the invention, mounted upon workpiece plates.
Figure 2:
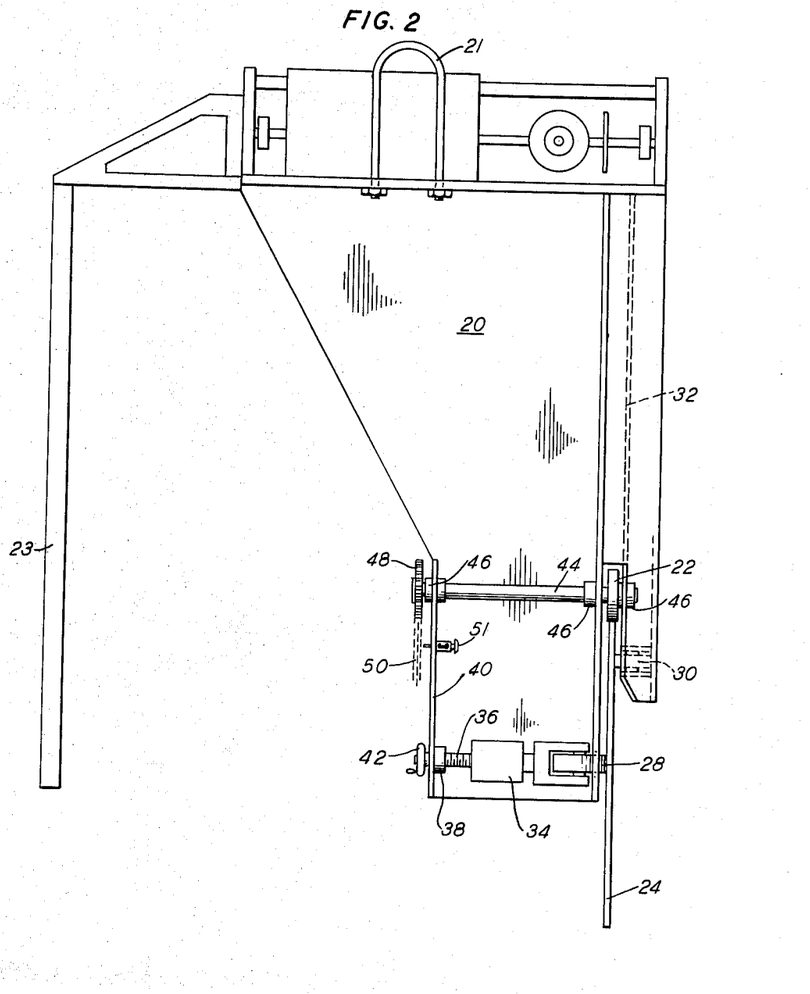
FIG. 2 is a side elevation of the apparatus illustrated in FIG. 1.

Referring particularly to FIGS. 1 and 2, 20 is a carriage for supporting a vertical welding machine or welding head. The carriage 20 has affixed thereto rollers 22 on horizontal axles, by means of which rollers the carriage 20 is movably supported in cantilever suspension upon the upper edges of generally vertically extending workpiece plates 24 and 26. The carriage 20 is secured against rotation about a horizontal axis in or parallel to the plane of the plates 24 and 26 by means of rollers 28 and 30 on vertical axles, the rollers 28 forming lower supports resting against the plates 24 and 26 respectively on the side thereof on which the bulk of the carriage 20 overhangs. The rollers 30 form upper supports resting against the plates 24 and 26 respectively on the side thereof opposite the rollers 28. Attached to or integral with the carriage 20 is a vertical run-off guide support plate 32 forward of and generally parallel to the plates 24 and 26.

Figures 3, 4, 5:
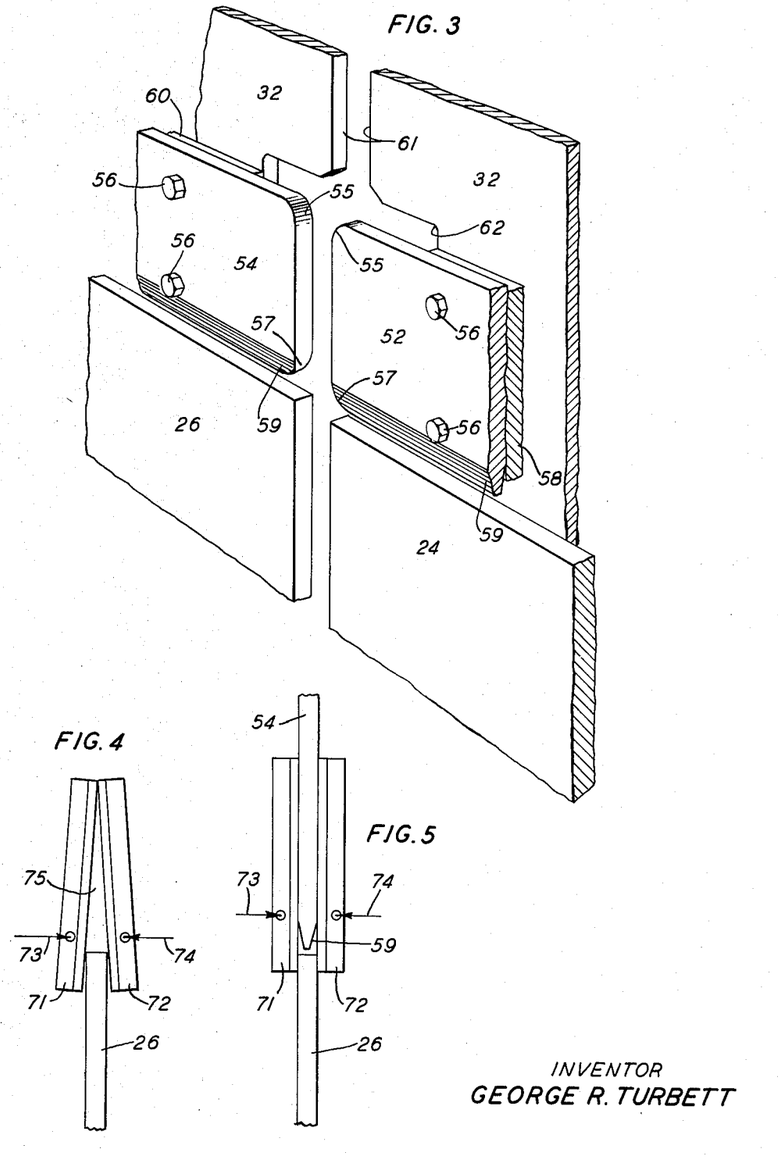
FIG. 3 is a fragmentary perspective view showing the manner of supporting run-off guide plates upon the carriage of the welding machine, the spatial relationship of the run-off plates and workpiece plates, and the substantial vertical and lateral alignment of the gap between the workpieces, the gap between the run-off plates, and the vertical slot in the run-off guide support plate.
FIGS. 4 and 5 are diagrams useful respectively in explaining the need for and mode of operation of run-off guides.

The rollers 30 are fixed in position relatively to the carriage 20, and because in use they bear against the right hand face of the respective plates 24 and 26, as viewed in FIGS. 2 and 3, these rollers determine the spatial relationship between the carriage and this face of the plates. The rollers 22 are preferably as wide or wider than the thickest plate to be welded in order to afford a maximum of support for the carriage and the welding head. The rollers 28 are movably mounted upon a slide block 34 threadedly engaged by a screw 36. The screw 36 is mounted for rotation in a bearing 38 that is secured to a flange 40 which is part of the carriage 20. A handwheel 42 may be provided as shown for adjusting the screw 36 to move the roller 28 toward or away from the plate 24 or plate 26 as the case may be, so that the housing 20 may be clamped to a plate of any desired thickness.

The plate 32 is preferably located a little to the right of the left hand edge of the roller 30 as viewed in FIG. 2 to provide room for adjusting the position of the run-off guide plates as will be explained below.

In order to make the carriage 20 readily movable along the top edges of the plates 24, 26 from one vertical joint to another, provision is made for driving at least one of the rollers 22. For this purpose, a shaft 44 attached to one of the rollers 22 extends through bearings 46 secured to the flange 40 and to the support plate 32, respectively. Mounted on the shaft 44 is a sprocket wheel 48 which is provided with a chain 50 for hand operation. The shaft 44 may of course be motor driven instead of hand operated, if desired. To lock the carriage 20 at the desired position with respect to the vertical joint, a slidable pin 51 is mounted on the flange 40 in suitable position to be pushed through links of the chain 50 on either side of the sprocket wheel 48.

Figure 6:
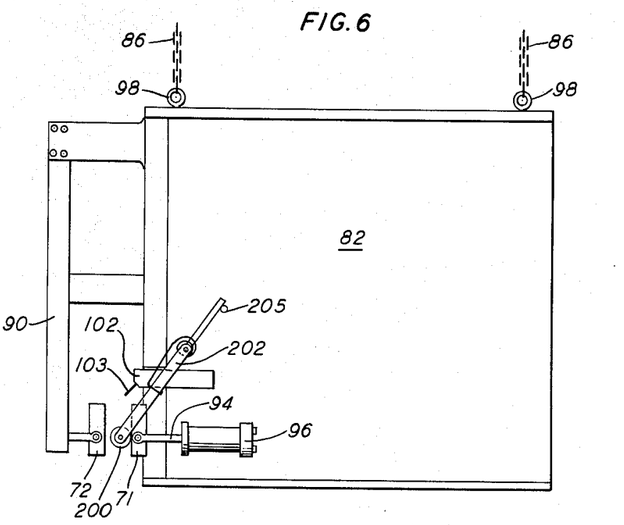
FIG. 6 is a general side elevational view of a welding machine or head suitable for use with the carriage shown in FIGS. 1 and 2.
Figure 7:
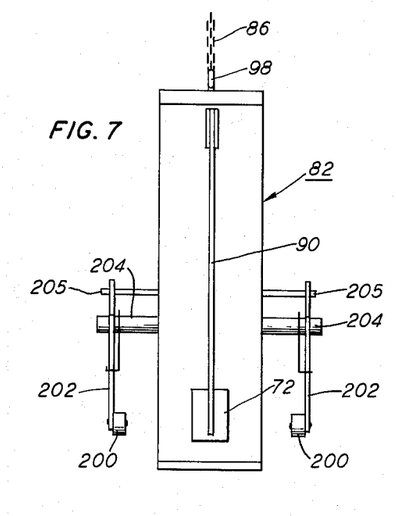
FIG. 7 is a general front elevational view of the welding machine or head shown in FIG. 6.
Figure 8:
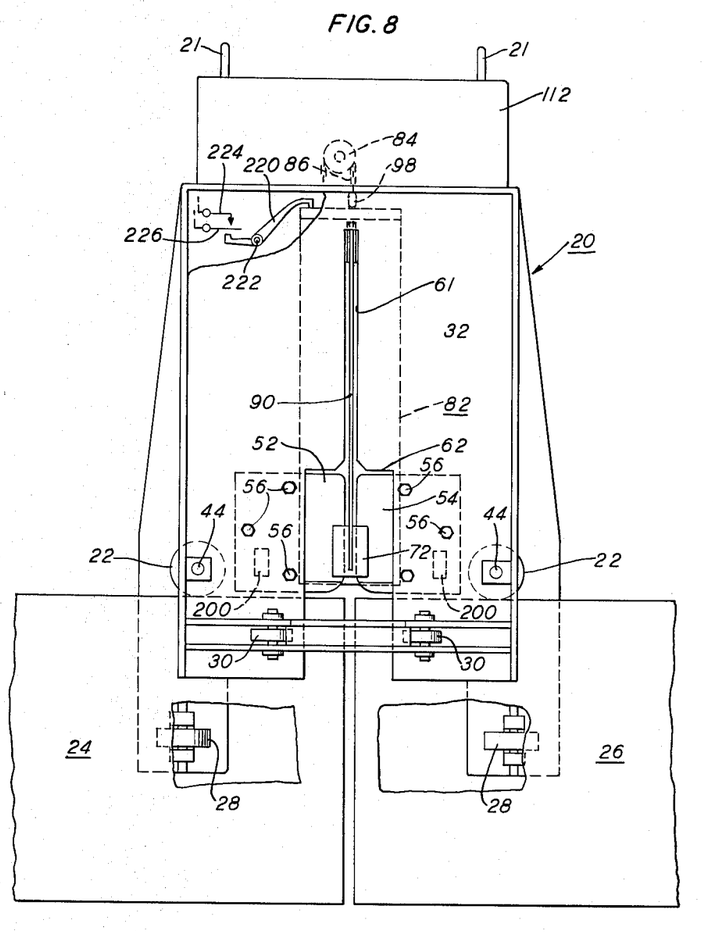
FIG. 8 is a front elevational view of the carriage of FIGS. 1 and 2, showing the welding head of FIGS. 6 and 7 in nesting position within the carriage and showing the carriage mounted upon a pair of workpiece plates in alignment with a gap between the workpiece plates in which gap a vertical weld is to be made.
Figure 9:
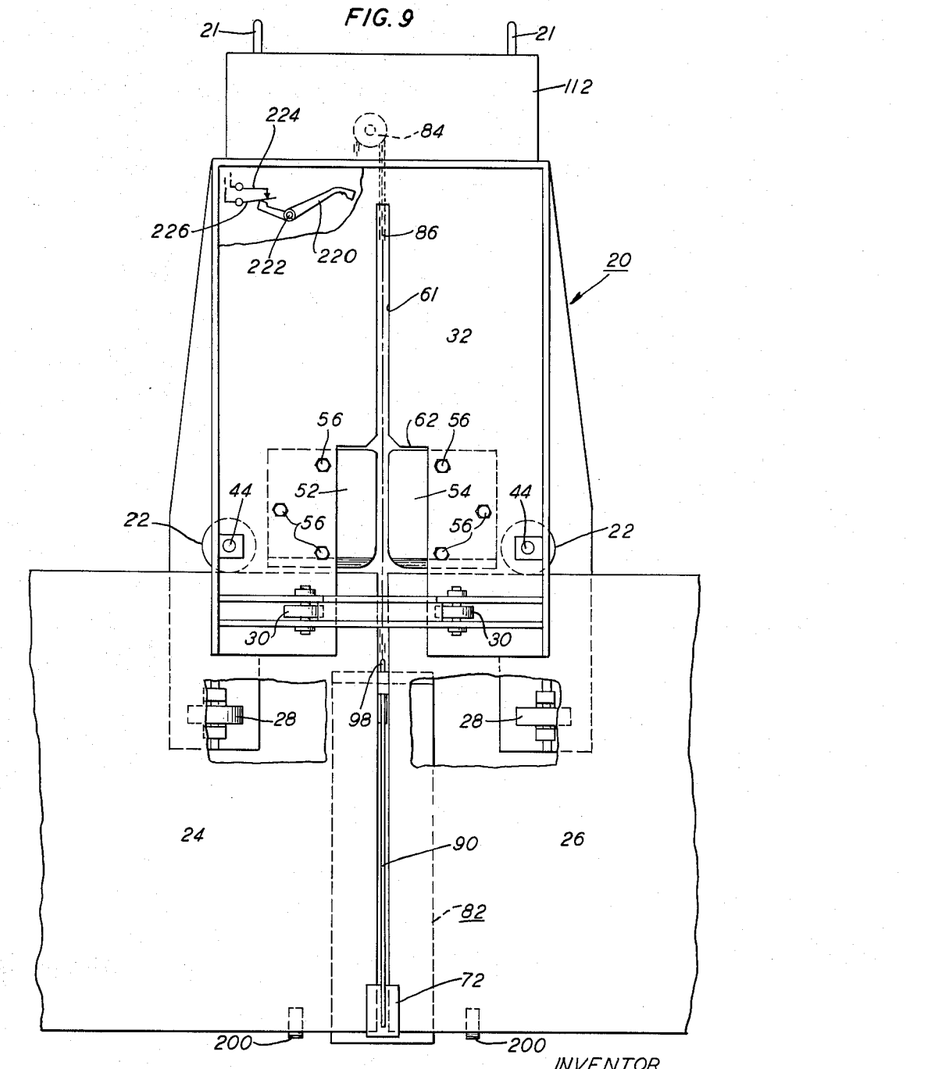
FIG. 9 is a front elevational view as in FIG. 8 except that the welding head is shown lowered to the bottom of the gap between the workpiece plates in position to start an upward vertical welding operation.

The welding head, shown generally in FIGS. 6 and 7, is supported from and for the main part contained within the carriage 20, as shown generally in FIGS. 8 and 9. To accommodate certain parts of the welding head that need to project through the plate 32, a vertical slot 61 (FIG. 1) is provided in the plate 32. An enlargement 62 of the slot 61 is formed at the bottom of plate 32 so that the outer welding dam 72 (FIG. 8) can enter and move within the opening 62 when the welding dams are in the neighborhood of the top edges of the workpiece plates. The slot 61 is preferably the same width as the gap between the workpiece plates to be welded, as the projecting parts of the welding head must pass through and work normally within the slot as well as pass through and work normally within the gap between the workpiece plates.

Run-off guide plates 52 and 54 are detachably mounted upon the support plate 32 by means of screws or bolts 56 as shown in FIG. 3. To permit the maintenance of a definite and fixed clearance between the support plate 32 and the facing workpiece plates 24, 26, shims 58, 60 of suitable thickness are fastened to the plate 32 or made integral therewith. To accommodate workpiece plates of various thicknesses, a separate pair of run-off guide plates may be provided for each workpiece thickness as required. The run-off guide plate is preferably the same thickness as the workpiece plate with which it is to be used, and the run-off guide plate should be aligned vertically above the workpiece plate with the bottom edge of the run-off guide plate parallel to and preferably separated from the upper edge of the workpiece plate by a slight clearance space, so that the run-off guide plate forms substantially an upward extension of the workpiece plate to support opposed welding dams as the latter reach the top of the vertical seam. The opposed vertical edges of the run-off guide plates 52, 54 are preferably parallel to each other and separated by a gap of substantially the same width as the gap between the two workpiece plates. In FIG. 3, the carriage 20 is assumed to be in such a position that slot 61 is vertically and laterally aligned with the gap between the workpiece plates 24 and 26.

Each run-off plate preferably has rounded corners 55 and 57, respectively, at top and bottom of their facing edges so as to prevent catching or jamming of the parts of the welding head which project through the slot and are raised and lowered during the welding operation. The bottom corners 57 are preferably given an additional flair for the purpose of preventing the heat of the weld pool from spreading materially to the run-off plates when the weld has been completed to a point where the weld pool is about level with the top edges of the workpiece plates and would otherwise be in close proximity to the run-off plates. If sufficient heat transfer is allowed to occur at this point, the result may be a welding of the workpiece plates to the run-off plates and this can be prevented by proper flairing at the bottom corners as indicated.

The bottoms of the run-off plates 52, 54 are preferably tapered as shown at 59 in order to prevent catching or jamming of the welding dams in case the vertical alignment of the faces of the workpiece plates and the run-off plates is somewhat imperfect.

The shims 58, 60 are located on the portion of plate 32 immediately on either side of the opening 62 and the run-off plates 52, 54 are positioned opposite the opening 62 with the gap between the run-off plates lying in a vertical plane containing the slot 61 and, when aligned as shown in FIG. 3, the gap between the workpiece plates 24, 26. There is thus formed a clearance vertical channel within which projecting parts of the welding head may be raised and lowered.

FIG. 4 illustrates diagrammatically the rotation of the welding dams that the invention serves to avoid. A pair of welding dams 71, 72 are pressed toward the opposite sides of the workpiece plate 26 by essentially horizontal forces represented by arrows 73, 74 applied through pivots to the dams, preferably at about one-third of the distance from the bottom to the top of the dam. In the absence of a run-off guide plate, the dams are rotated about the respective upper edges of the plate 26 as shown. While only one workpiece plate 26 appears in the views shown in FIGS. 4 and 5, it will be evident that the welding dams bear upon both workpiece plates 24 and 26, the dams actually rotating about the respective upper edges of both plates with the result as above stated.

FIG. 5 illustrates diagrammatically the function of the run-off guide plate in permitting the proper operation of the welding dams in finishing off the top of the seam. The run-off guide plate 54 being of substantially the same thickness as the plate 26 and being close to and aligned with the plate 26 serves as a virtual upward extension of the plate 26 so that the dams 71, 82 are adequately supported as they rise above the top edge of the workpiece plates and ride up onto the run-off guide plates. The rise of the welding dams may be continued until they leave the plates 24 and 26 and rest entirely upon the run-off guide plates 52 and 54, in the nesting position, as indicated by the position of the dam 72 in FIG. 8.

Referring particularly to FIGS. 6 and 7, an illustrative embodiment of a welding head is shown as a box-like member 82 for supporting desired components such as an electrode wire feed mechanism, wire straightener, touch-retract arc starting mechanism, mechanical oscillator for arc electrode, operator's controls, etc. From the member 82 there is supported the welding dam 72 pivoted upon an arm 90, the latter being of narrow configuration capable of passing through the gap between the workpieces 24, 26. The welding dam 71 is movable with reference to the dam 72 to accommodate different thicknesses of workpieces and can be moved by means of a piston rod 94 to which it is pivoted, and is controlled by means such as a pneumatic cylinder 96. An electrode holder 102 is arranged to project from the member 82 into the arc region, the holder 102 being of narrow configuration capable of passing through the gap between the workpieces 24, 26, the electrode tip appearing at 103. The member 82 is provided with chain anchorages 98 to which are attached chains 86 for suspending and for raising and lowering the welding head.

Figure 10:
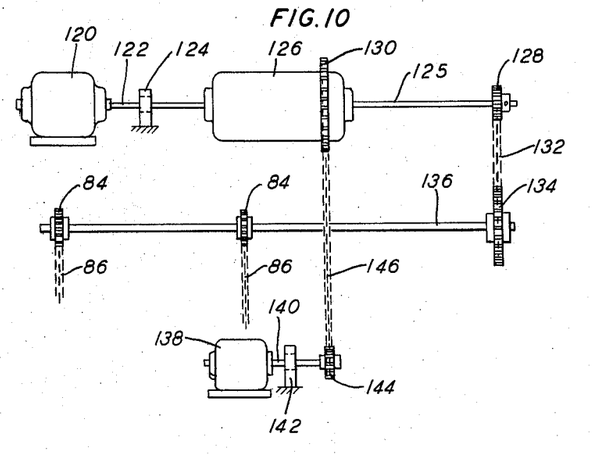
FIG. 10 is a mechanical schematic diagram of motor driven means for raising and lowering the welding head between different levels during welding operations.

FIGS. 8 and 9 show the carriage 20, and welding head 82, supported upon the upper edges of the workpieces 24, 26 with the vertical slot 61 in the vertical run-off guide support plate 32 aligned in the same vertical plane with the gap between the workpieces. In FIG. 8, the welding head is shown nested within the carriage 20 with all parts which project beyond the plane of the workpieces raised above the level of the top edges of the workpieces. With the welding head so nested, the carriage 20 may be rolled along the upper edges of the workpieces to the location of another vertical seam, or the carriage may be left in place as shown and the welding machine may be lowered into the gap between the workpieces 24, 26 to perform a vertical weld in order to fill the gap and join the workpiece together in a vertical seam. For raising and lowering the welding head, the chains 86 may be run over respective power driven sprocket wheels 84 which latter may be mounted in the upper portion 112 of the carriage 20. The sprocket wheels 84 may be motor-driven in known manner by elevator apparatus (e.g., as shown in FIG. 10) contained in the upper portion 112 of the carriage. In the nested state, the welding dams 71, 72 rest upon the surfaces of the run-off guides 52, 54 preferably with the lower edge of the dam a little above the lower edges of the run-off guides. The rollers 22 rest upon the upper edges of the workpieces. The rollers 30 bear against the front surfaces of the workpieces 24, 26 as viewed in FIGS. 8 and 9 and the rollers 28, partially hidden behind the workpieces 24, 26 in these figures, bear against the back surfaces of the workpieces.

In FIG. 9, the welding head is shown in lowered position near the bottom of the gap between the workpieces 24, 26. The welding dam 72 is shown resting upon the surfaces of the workpieces, spanning the gap between the workpieces.

In FIGS. 6 and 7 there are schematically shown spring loaded outrigger rollers 200, mounted upon horizontal axles attached to arms 202 which are in turn rotatably mounted upon supports 204 extending from the sides of the support member 82 of the welding head. With the welding head in place within the carriage 20 and in operative relationship to the plates 24, 26, the rollers 200 are pressed against the back surfaces of the respective plates as viewed and shown in FIG. 9, in which position the rollers tend to prevent swaying or rotation of the welding head about a vertical axis during the welding operation. When the welding dams pass from the plates 24, 26 onto the run-off plates 52, 54, the rollers 200 roll smoothly from the plates 24, 26 onto the run-off plates, the diameter of the rollers 200 being preferably large enough to ensure proper transfer even in the presence of a small misalignment between the workpiece plates and the run-off plates. In the nested position of the welding head, as shown in FIG. 8, the rollers 200 rest upon the run-off plates. It will be noted that the run-off plates are extended sufficiently in width when it is desired that they accommodate the rollers 200 as shown in FIG. 8. Stops 205 are mounted on the support member 82 in position to limit the rotation of the respective arms 202 in response to the action of the loading springs.

FIGS. 8 and 9 show one form of a limit switch for shutting off the welding current when the weld pool has reached a level substantially at the top edges of the plates 24, 26. A bell crank 220 is rotatively mounted on a pivot 222 supported at a suitable position from the frame 20. Electrical contactors 224 and 226 are mounted upon a portion of the frame 20 adjacent to the lefthand end of the crank 220 as viewed in the figures. These contactors serve to open or to complete the welding current circuit. During the welding operation up until the time that the weld pool reaches the desired height, the righthand end of the crank 220 is held down by gravity so that the lefthand end of the crank maintains contactor 226 pressed in electrical contact with contactor 224, completing the welding current circuit, as illustrated in FIG. 9. When the desired weld pool level is reached, the rising carriage 20 strikes the righthand end of the crank 220 and raises it, thereby breaking the contact between the contactors 224 and 226 and stopping the welding.

An illustrative form of elevator mechanism for raising and lowering the welding head is shown schematically in FIG. 10. Preferably two motors are provided, one for raising the welding head at a suitable slow rate during the welding operation proper and another for lowering the welding head at a relatively rapid rate to the lower level of a gap between two members to be welded. A fist motor 120 is shown having a shaft 122 for furnishing power to lift the welding head. During lowering of the welding head, the shaft 122 may be prevented from turning by application of a brake 124. The shaft 122 is geared to a shaft 125 by means of a differential reduction gearing 126, upon which shaft 125 is secured a sprocket wheel 128. Differentially geared to the shaft 125 is another sprocket wheel 130 for use in lowering the welding head. The sprocket wheel 128 for raising the welding head is connected in driving relation by means of a chain 132 to a driven sprocket wheel 134 that is secured to a drive shaft 136 to which are secured the lift sprocket wheels 84, which may be arranged near the respective ends of the welding head suspended therefrom, the chains 86 being attached to the welding head, engaging the respective sprocket wheels, and being received in suitable receptacles such as chain buckets (not shown) in well known manner. A second motor 138 is shown having a shaft 140 for furnishing power for rapidly lowering the welding head. During raising of the welding head, the shaft 140 may be prevented from turning by application of a brake 142. The shaft 140 has secured thereto a sprocket wheel 144 which is connected in driving relation to the sprocket wheel 130 by means of a chain 146. Self-locking reduction gearing may be used between shaft 140 and sprocket wheel 144, in which case the brake 142 is not needed.

In the operation of the elevator mechanism shown in FIG. 10, when it is desired to raise the welding head so as to perform a weld, the shaft 140 may be locked and the brake 124 released. Motor 120 is then energized to turn the shaft 122. The shaft 125 will then be turned at reduced speed compared to shaft 122 through the reducing gearing in member 126, the rotation being transmitted by way of sprocket wheel 128, chain 132, sprocket wheel 134, shaft 136 and sprocket wheels 84 to the chains 86, the direction of rotation being predetermined so as to lift the chains 86 and the welding head attached thereto.

When it is desired to lower the welding head, the motor 120 is turned off and the brake 124 is set, thereby locking shaft 122. Brake 142 may now be released and motor 138 started. Shaft 140 is thereby turned and its motion is transmitted through sprocket wheel 144 and chain 146 to sprocket wheel 130. The latter sprocket wheel is geared to the shaft 125 through the member 126 to turn the shaft 125 in the reverse direction and at a higher speed than in the case when the welding head is to be raised. The shaft 125 transmits its motion to the chains 86 as previously described, in this case to rapidly lower the welding head.

Figure 11:
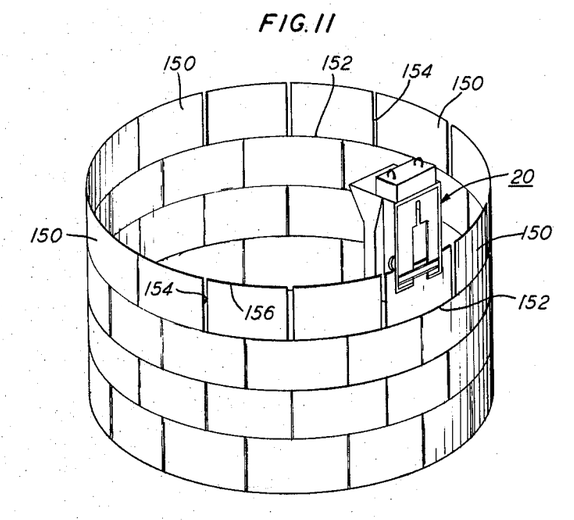
FIG. 11 is a perspective view showing a carriage of the general type shown in FIGS. 1 and 2 mounted upon the upper edges of workpiece plates forming a tier of plates in a partially completed metal tank of cylindrical form.

The combination of welding head, carriage, run-off guides, and nesting slot as shown and described herein may be advantageously employed in performing a plurality of operations in various ways, of which the following is illustrative. For example, in the fabrication of a cylindrical tank from a plurality of curved plates to be welded together in a form such as that shown in FIG. 11, a tier of plates 150 may have been fastened in place by a horizontally welded seam 152, or by any suitable temporary means, leaving suitably dimensioned vertical gaps 154 between adjacent plates, and forming a substantially level horizontal upper edge 156 providing a track from which the carriage 20 may be suspended and upon which the carriage may be run horizontally from the location of one vertical gap 154 to another. To position the carriage for a vertical seam, the carriage may be rolled along the edge 156 until the slot between the run-off guides is vertically aligned with the gap between the plates to be welded, this operation being performed with the welding head nested in the nesting slot of the carriage as shown in FIG. 8. Next, the welding head may be relatively rapidly lowered by means such as shown in FIG. 10 to bring the welding electrode into the gap in a position to begin welding at the bottom of the seam, as shown in FIG. 9, the electrode holder being lowered from the slot between the run-off guides and down through the gap between the plates to be welded. Then, welding may be performed while slowly raising the welding head so as to weld completely up the seam gap to the top of the seam, whereupon the welding head is further raised to nest the welding head within the carriage, with the welding dams resting upon the run-off guides as indicated by FIG. 8. The carriage 20 may now be rolled along the upper edges 156 of the plates to the location of the next vertical seam to be welded. It will be evident that the carriage and welding head are at all times supported securely in cantilever fashion upon the tier of plates to be welded and may be freely moved along these edges when desired. The plates may be arranged in a straight or curved line as desired, and the curvature of the line may vary so long as the curve is not too sharp to be negotiated by the arrangement of rollers by which the carriage is supported.

When the welding of an entire tier of workpiece plates has been completed, the carriage and welding head as a unit may be lifted off the plates as by means of a crane engaging a suitable member or members of the carriage assembly such as U-bolts 21 (FIG. 2), and the next tier may be set up for vertical welding in accordance with usual practices. For example, the plates may be held temporarily in place by means of pins and clips in well-known manner. It may be preferred practice to complete the welding of all the vertical seams in the tier of plates before welding the tier to the tier below along a horizontal seam. In practice, only a relatively small number of pins and clips are required to hold the tier of plates in position over the tier below and to maintain the proper spacing between the vertical edges of the plates for vertical welding. Thereupon, the crane may be used to place the carriage and welding head in position upon the top edge of the new tier of plates to be welded and operations may be continued as above described. Whenever the carriage and welding head are to be removed from the workpieces, the welding head may be nested in the carriage and the carriage and welding head as a unit may be set upon the floor or ground, in which position a leg 23 (FIG. 2) serves to prevent the assembly from tipping over.

While illustrative forms of apparatus and methods in accordance with the invention have been described and shown herein, it will be understood that numerous changes may be made without departing from the general principles and scope of the invention.

I claim as my invention:

1. The method of welding successive vertical seams in a tier of workpiece plates separated by vertical gaps between plates to be welded, employing a carriage movable horizontally along an upper edge of said plates and a welding head movable vertically guided by a vertical slot in said carriage, said method comprising the steps of aligning said carriage so that the vertical slot in the carriage is in a vertical plane with the said vertical gap between plates, which vertical plane is substantially perpendicular to the plane of the plates to be welded, lowering the welding head from the carriage through the said vertical slot in the carriage and into the said vertical gap between the plates to be welded, imparting welding action to the welding head while imparting rising movement to the welding head so as to weld completely up the vertical gap between the plates, nesting the welding head in the said vertical slot in the carriage by further raising the welding head to such a level as to clear the top edge of the tier of plates, and moving the carriage and welding head as a unit horizontally along the upper edge of the tier of plates to the position of another vertical gap between plates to be welded, so that the above sequence of steps may be repeated.

2. The method of welding successive vertical seams in a tier of workpiece plates separated by vertical gaps between plates to be welded, employing a carriage movable horizontally along the upper edges of said plates and a welding head movable vertically guided by a vertical slot in said carriage and said welding head having welding dams movable therewith and said carriage having run-off guide plates removably attached thereto and spaced apart by a gap vertically and laterally aligned with the said vertical slot in the carriage, said method comprising the steps of positioning said carriage so that the vertical slot in the carriage and the gap between the run-off guide plates are substantially in a vertical plane with the said vertical gap between a pair of said plates to be welded, lowering the welding head from the carriage through the said vertical slot in the carriage and through said gap between the run-off guide plates into the said vertical gap between the plates to be welded, imparting welding action to the welding head while imparting rising movement to the welding head and to the welding dams so as to weld completely up the vertical gap between the plates, running the welding dams off the workpiece plates onto the run-off guide plates as the seam is completed to the top edges of the workpiece plates, nesting the welding head in the said vertical slot in the carriage by further raising the welding head and welding dams until the welding dams rest completely upon the run-off guide plates to such level that the welding head completely clears the top edge of the tier of workpiece plates, and moving the carriage and welding head as a unit horizontally along the upper edge of the tier of plates to the position of another vertical gap between plates to be welded, so that the above sequence of steps may be repeated.

3. In vertical welding apparatus, in combination, a carriage movable horizontally along horizontally aligned upper edges of a tier of workpiece plates to be joined by means of vertical seams, a run-off guide plate mounted upon said carriage and movable horizontally therewith, said run-off guide plate being arranged to be substantially coplanar with the workpiece plates and in close proximity thereto so as to form substantially an upward extension of the workpiece plates onto which at least one workpiece-contacting part of a welding head can run off from a workpiece plate as the welding operation completes the top portion of the seam.

4. Apparatus according to claim 3, in which the said run-off guide plate is of substantially the same thickness as the workpiece plates.

5. In vertical welding apparatus, in combinaiton, a carriage movable horizontally along horizontally aligned upper edges of a tier of workpiece plates to be joined by means of vertical seams, a pair of spaced run-off guide plates mounted upon said carriage and movable horizontally therewith, said run-off guide plates being arranged to be substantially coplanar with the workpiece plates and in close proximity thereto so as to form substantially an upward extension of the workpiece plates onto which at least one workpiece-contacting part of a welding head can run off from a workpiece plate as the welding operation completes the top portion of the seam.

6. Apparatus according to claim 5, in which the said run-off guide plates have spaced vertical edges facing each other to define a gap of substantially the same width as the gap between two adjacent workpiece plates to be welded.

7. In vertical welding apparatus, in combination, a carriage movable horizontally along the horizontally aligned upper edges of a tier of workpiece plates to be joined by means of vertical seams, said carriage being maintained in cantilever suspension from one or more of said workpiece plates, said cariage including a vertical plate member having a vertical slot therein, a welding head supported by said carriage and movable vertically with respect to said carriage and guided by said vertical slot, means for horizontally positioning said carriage to bring the said vertical slot into substantial alignment with the gap between a pair of said workpiece plates wherein a vertical seam is to be made, means to raise and lower the said welding head to carry on a vertical welding operation, said vertical slot serving to nest the said welding machine in an upper portion of the carriage clear of the workpiece plates between welding operations, and said means for horizontally positioning the carriage being effective to move the carriage and nested welding head to the position of another seam to be welded.

8. In vertical welding apparatus, in combination, a carriage movable horizontally along the horizontally aligned upper edges of a tier of workpiece plates to be joined by means of vertical seams, said carriage being maintained in cantilever suspension from one or more of said workpiece plates, said carriage including a vertical plate member having a vertical slot therein, a welding head supported by said carriage and movable vertically with respect to said carriage guided by said vertical slot, means for horizontally positioning said carriage to bring the said vertical slot in substantial alignment with the gap between a pair of said workpiece plates where a vertical seam is to be made, means to lower said welding head to welding relationship with a lower portion of the gap between said pair of workpiece plates to start welding a seam, said welding head being guided initially during lowering by said vertical slot in the carriage and thereafter by the gap between said workpiece plates, means to raise said welding head while performing a welding operation therewith, said welding head being guided initially during raising by the gap between said workpiece plates and thereafter by said vertical slot in the carriage to complete the weld to the top of the seam gap and thereafter to nest the welding head in the carriage clear of the workpiece plates, said means for horizontally positioning said carriage being effective to move the carriage and nested welding head to the position of another seam gap to be welded.

9. In vertical welding apparatus, in combination, vertical seam welding means, means to support said welding means upon the generally horizontal top edges of a plurality of aligned and spaced plates that are to be welded together in a plurality of substantially vertical seams, means to move said welding means and said supporting means as a unit in a generally horizontal direction upon and parallel to the said top edges of said plates from one seam location to another, a pair of tabs each comprising a relatively small run-off guide plate of substantially the same thickness as the plates to be welded, said tabs being carried by said supporting means and movable as a unit therewith by said moving means, said tabs being positioned substantially coplanarly with respect to said plates to be welded and having their lower edges parallel to and narrowly spaced from the said top edges of said plates to be welded so as to form a virtual upward extension of a portion of said plates to be welded, said tabs having a pair of substantially parallel facing vertical edges defining a gap of substantially the same width as the gap between adjacent plates to be welded, said tabs being movable along with said supporting means in such manner as to enable the gap between the tabs to be substantially aligned vertically with the gap between said plates to be welded, whereby there can be formed an upward extension of the seam gap effectively above and beyond the upper terminus of the region in which weld metal is to be deposited, said tabs thereby providing means for supporting a pair of opposed welding dams in proper operating relationship to the plates to be welded while completing a vertical seam to the upper terminus of the gap between the plates to be welded, and also maintaining an extended cavity for confining shielding gas.

10. In vertical welding apparatus, in combination a carriage movable horizontally along aligned upper edges of a tier of workpiece plates to be joined by means of vertical seams, a welding dam carried by said carriage and movable vertically with reference to said carriage along a surface of said workpiece plates, said carriage having a vertical plate attached thereto and arranged substantially parallel to said surface and on the same side of said workpiece plates as the said surface along which said welding dam is movable, said vertical plate having a vertical slot therein of substantially the same width in the upper portion thereof as the gap between the workpiece plates, said slot being widened and open in its lower portion to accommodate said welding dam, a pair of run-off guide plates supported by said vertical plate and arranged on opposite sides of said widened slot portion, said run-off guide plates having spaced vertical edges facing each other to define a gap of substantially the same width as the gap between the workpiece plates and vertically aligned with said upper slot portion, said run-off guide plates being arranged to be substantially coplanar with the workpiece plates and in close proximity thereto at their lower edges so as to form substantially an upward extension of the workpiece plates onto which guide plates said welding dam can run off from the workpiece plates into said widened slot portion of said vertical plate as the welding dam is moved beyond the top portion of the seam in the course of vertical welding.

References Cited by the Examiner
UNITED STATES PATENTS

| | | | |
|---|---|---|---|
| 2,737,565 | 3/1956 | Meyer | 228—32 X |
| 2,960,053 | 11/1960 | Meyer | 228—32 |
| 2,969,454 | 1/1961 | Lucey | 219—126 |
| 3,134,014 | 5/1964 | Shupp | 219—126 |

WHITMORE A. WILTZ, *Primary Examiner.*

THOMAS H. EAGER, *Examiner.*